US007339569B2

(12) United States Patent
Moon et al.

(10) Patent No.: US 7,339,569 B2
(45) Date of Patent: Mar. 4, 2008

(54) LIQUID CRYSTAL DISPLAY, APPARATUS FOR DRIVING A LIQUID CRYSTAL DISPLAY, AND METHOD OF GENERATING GRAY VOLTAGES

(75) Inventors: Seung-Hwan Moon, Seoul (KR); Nam-Soo Kang, Ansan (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/237,303

(22) Filed: Sep. 9, 2002

(65) Prior Publication Data

US 2003/0058375 A1 Mar. 27, 2003

(30) Foreign Application Priority Data

Sep. 7, 2001 (KR) ............................ 2001-55036

(51) Int. Cl.
*G09G 3/36* (2006.01)
*G09G 5/00* (2006.01)
*G06F 3/038* (2006.01)

(52) U.S. Cl. ........................................ 345/94; 345/208

(58) Field of Classification Search .................. 345/87, 345/89–92, 94–96, 98–100, 103, 204, 208, 345/209, 690
See application file for complete search history.

(56) References Cited

U.S. PATENT DOCUMENTS 5,790,092 A * 8/1998 Moriyama .................. 345/96
5,940,055 A 8/1999 Lee ............................ 345/87
6,040,814 A * 3/2000 Murakami et al. ............ 345/94
6,075,507 A 6/2000 Miyahara et al.
6,295,043 B1 * 9/2001 Hashimoto et al. ........... 345/96
6,400,350 B1 * 6/2002 Nishimura et al. ........... 345/96
6,583,778 B1 * 6/2003 Nishimura et al. ........... 345/96
6,781,568 B2 * 8/2004 Nishimura et al. ........... 345/96
6,842,161 B2 * 1/2005 Song et al. .................... 345/87

FOREIGN PATENT DOCUMENTS

JP 08043795 2/1996
JP 09015560 1/1997

(Continued)

OTHER PUBLICATIONS

*Preliminary Notice of Rejection of the IPO* (Translation); Issuance Date: May 28, 2003; Applicant: Samsung Electronics Co., Ltd.; Attorney: C.V. Chen; pp. 1-2.

*Primary Examiner*—Jeff Piziali
(74) *Attorney, Agent, or Firm*—Cantor Colburn LLP

(57) ABSTRACT

A liquid crystal display, apparatus for driving a liquid crystal display and a method of driving gray voltages for the same. The liquid crystal display includes a plurality of gate lines transmitting gate signals, a plurality of data lines intersecting the plurality of gate lines and transmitting data voltages, and a plurality of pixel rows. Each pixel row includes a plurality of pixels, and each pixel includes a switching element connected to one of the plurality of gate lines and one of the plurality of data lines. The polarity of the data voltages supplied to the plurality of pixels are inverted by a pixel group including two or more pixel rows. The absolute values of the data voltages applied to one row of the pixel group with respect to a first predetermined voltage are greater than the absolute values of the data voltages applied to another row of the pixel group for the same grays.

16 Claims, 6 Drawing Sheets

FOREIGN PATENT DOCUMENTS

| | | |
|---|---|---|
| JP | 10301538 | 11/1998 |
| JP | 11271716 | 10/1999 |
| JP | 2001108964 | 4/2001 |
| KR | 1999011349 | 2/1999 |
| WO | 0124154 | 4/2001 |

* cited by examiner

LIQUID CRYSTAL DISPLAY, APPARATUS FOR DRIVING A LIQUID CRYSTAL DISPLAY, AND METHOD OF GENERATING GRAY VOLTAGES

BACKGROUND OF THE INVENTION (a) Field of the Invention

The present invention relates to a liquid crystal display, an apparatus for driving a liquid crystal display, and a method of generating gray voltages for a liquid crystal display.

(b) Description of the Related Art

A typical liquid crystal display ("LCD") includes a pair of transparent glass substrates facing each other to define a narrow gap therebetween and a liquid crystal layer with dielectric anisotropy filled in the gap. A plurality of field-generating electrodes opposite each other are provided on the inner surfaces of the respective glass substrates. The field-generating electrodes are applied with voltages to generate an electric field in the liquid crystal layer. The LCD displays a desired image by controlling the voltages applied to the field-generating electrodes to adjust the transmittance of light passing through the liquid crystal layer.

Among the LCDs, a thin-film transistor ("TFT") LCD using TFTs as switching elements is widely used. A typical TFT LCD has a plurality of pixels arranged in a matrix, a plurality of gate lines extending in a row direction, and a plurality of data lines extending in a column direction. Each pixel includes a TFT connected to one of the gate lines and one of the data lines and a liquid crystal capacitor having a pixel electrode, a common electrode opposite thereto and a liquid crystal layer therebetween.

An electric field is generated by the voltage difference between the pixel electrodes and the common electrode, and the field direction is periodically inversed in order to prevent the deterioration of the characteristics of the LCD. If not, continuous application of unidirectional electric field causes precipitation of ionic impurities in the liquid crystal layer onto the pixel electrodes and the common electrode, thereby causing electrochemical reactions in the electrodes. The field-direction is inversed by reversing the polarity of the voltages applied to the pixel electrodes (referred to as "data voltages" hereinafter) with respect to the voltage applied to the common electrodes (referred to as "common voltage" hereinafter).

The inversion in an LCD reverses the polarity of the data voltages by frame ("frame inversion"), by row ("line inversion"), and by pixel ("dot inversion").

The dot inversion includes one dot inversion and two-to-one dot inversion. The dot inversion reverses the polarities of the pixels adjacent to each other in the row direction. In the one dot inversion, the adjacent pixels in the column direction have the opposite polarities. On the other hand, the polarity of the pixels in the column direction is reversed every two rows in the two-to-one inversion.

In the dot inversion, voltages across liquid crystal capacitors (referred to as "pixel voltages") in a row are dropped when liquid crystal capacitors in the next row are charged, since parasitic capacitors between the liquid crystal capacitors in the adjacent rows generate AC currents. In particular, the voltage difference of the pixels in adjacent two rows with the same polarity in the two-to-one dot inversion induces brightness difference therebetween. For example, the upper one of two adjacent pixels with the same polarity in the column direction, when applied with the same data voltage, has larger pixel voltage than the lower one.

On the contrary, voltage delay caused by a slew rate decreases the pixel voltage of the upper pixel larger than the lower pixel. For example, it is assumed that the same data voltage is applied to the upper and the lower pixels. The data voltage flowing through the data line experiences RC delay when charging the upper pixel since the voltage difference from the previous data voltage with different polarity is large. That is, the large voltage difference makes it to take time to reach the expected value. However, the data voltage hardly experiences the RC delay when charging the lower pixel since the data voltages for the upper and the lower pixels are the same. Therefore, the pixel voltage of the upper pixel has a smaller value than the lower pixel.

SUMMARY OF THE INVENTION

A liquid crystal display is provided, which includes: a plurality of gate lines transmitting gate signals; a plurality of data lines intersecting the plurality of gate lines and transmitting data voltages; and a plurality of pixel rows, each pixel row including a plurality of pixels, each of the plurality of pixels including a switching element connected to one of the plurality of gate lines and one of the plurality of data lines, wherein polarity of the data voltages supplied to the plurality of pixels are inverted by a pixel group including two or more pixel rows, and absolute values of the data voltages applied to one row of the pixel group with respect to a first predetermined voltage are greater than the absolute values of the data voltages applied to another row of the pixel group for the same grays.

It is preferable that the one pixel row is firstly or lastly applied with the data voltages in the pixel group.

According to an embodiment of the present invention, the liquid crystal display further includes a gate driver for sequentially supplying a gate-on voltage to the plurality of gate lines to turning on the switching elements; a gray voltage generator generating a plurality of gray voltages, each gray voltage having at least two different values; and a data driver for selecting the plurality of gray voltages and supplying the selected gray voltages as the data voltages to the plurality of pixels via the turned on switching elements.

According to an embodiment of the present invention, the gray voltage generator includes a gray voltage producer generating the plurality of gray voltages based on a plurality of reference voltages including a first reference voltage; and a reference voltage producer, connected to the gray voltage producer, generating the first reference voltage with a value which varies depending on the number of the pixel rows in the pixel group to provide for the gray voltage producer.

According to an embodiment of the present invention, the reference voltage producer includes a pulse signal producer generating at least one pulse signal having a period depending on the number of the pixel rows in the pixel group; and a level adjuster adjusting a voltage level of the at least one pulse signal from the pulse signal producer to generate the first reference voltage.

According to an embodiment of the present invention, the at least one pulse signal includes a first pulse signal and a second pulse signal, the first and the second pulse signals are inverted signals of each other. The level adjuster includes an input voltage generator alternately switching the first and the second pulse signals and changing levels of the first and the second pulse signals to generate a first voltage, and a level changer changing the first voltage to generate the first reference voltage.

According to an embodiment of the present invention, the input voltage generator comprises a switch alternately switching the first and the second pulse signals and a plurality of resistors comprising a pair of first resistors connected in series between a second predetermined voltage and a third predetermined voltage and a pair of second resistors respectively connected to the first and the second pulse signals, the switch is connected to a first node between the first resistors and alternately connected to the second resistors, and the input voltage generator outputs a voltage of the first node.

It is preferable that the level changer includes an amplifier amplifying the first voltage, and a third resistor connected between the amplifier and the gray voltage producer. Furthermore, when the plurality of reference voltages further comprises a second reference voltage, the level changer preferably includes an inverter inverting an output of the amplifier with respect to a second predetermined voltage, a fourth resistor, connected between the inverter and the gray voltage producer, for providing the second reference voltage.

According to an embodiment of the present invention, the gray voltage producer includes a plurality of fifth resistors for positive grays connected in series a plurality of sixth resistors for negative grays connected in series, one of the first and the second reference voltages are provided for a node between the fifth resistors, and the other of the first and the second reference voltages are provided for a node between the sixth resistors.

According to an embodiment of the present invention, the pulse signal producer includes a D flip flop generating the first and the second pulse signals based on a clock signal for the gate driver. The pulse signal producer further comprises an OR gate ORing the first pulse signal and a start signal for the gate driver to provide a signal for the D flip flop as an input.

According to another embodiment of the present invention, the at least one pulse signal includes a first pulse signal and a second pulse signal, the first and the second pulse signals are inverted signals of each other, and the level adjuster includes a resistor connected to one of the first and the second pulse signals.

An apparatus for driving a liquid crystal display is provided, which includes: a gray voltage producer generating a plurality of positive gray voltages and a plurality of negative gray voltages based on a plurality of reference voltages including a first reference voltage for positive grays and a second reference voltages for negative grays; a pulse signal producer generating first and second pulse signals with inverted phases; and a level adjuster adjusting a voltage level of the first and the second pulse signals from the pulse signal producer to generate the first and the second reference voltages.

The level adjuster preferably includes a switch alternately switching the first and the second pulse signals; a pair of first resistors connected in series between a first predetermined voltage and a second predetermined voltage; a pair of second resistors respectively connected to the first and the second pulse signals, the switch connected to a node between the first resistors and alternately connected to the second resistors; a first amplifier, connected to the node, for amplifying a voltage of the node to produce the first reference voltage; and a second amplifier inverting an output of the amplifier with respect to a predetermined voltage to produce the second reference voltage.

A method for generating gray voltages with changing amplitudes for a liquid crystal display is provided, which includes: generating first and second pulse signals with inverted phases; periodically switching the first and the second pulse signals; changing levels of the first and the second pulse signals to generate a first voltage; amplifying the first voltage to produce a first reference voltage; inverting the first reference voltage with respect to a predetermined voltage to produce a second reference voltage; and generating a plurality of positive and negative gray voltages based on the first and the second reference voltages.

BRIEF DESCRIPTION OF THE DRAWINGS

The above and other objects and advantages of the present invention will become more apparent by describing preferred embodiments thereof in detail with reference to the accompanying drawings in which.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein. Like numerals refer to like elements throughout. Then, liquid crystal displays and methods of driving the same according to embodiments of the present invention will be described with reference to the drawings.

Figure 1:
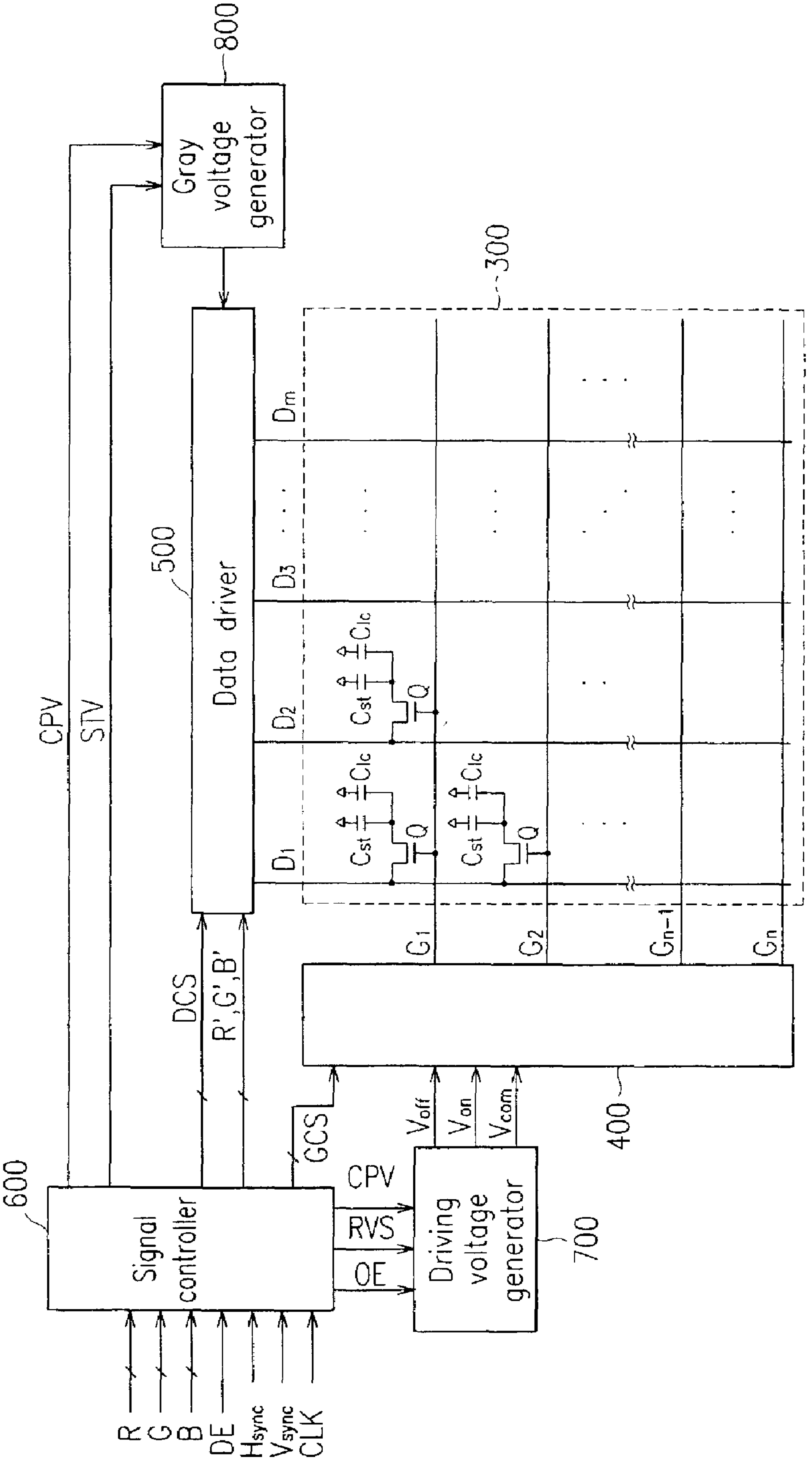
FIG. 1 is a block diagram of an LCD according to an embodiment of the present invention.

FIG. 1 is a block diagram of an LCD according to an embodiment of the present invention.

As shown in FIG. 1, an LCD includes an LCD panel assembly 300, a gate driver 400, a data driver 500, a signal controller 600, a driving voltage generator 700, and a gray voltage generator 800.

In view of circuit diagram, the panel assembly 300 includes a plurality of display signal lines $G_1$-$G_n$ and $D_1$-$D_m$ and a plurality of pixels connected thereto.

The display signal lines include a plurality of gate lines (or scanning signal lines) $G_1$-$G_n$ extending in a row direction, a plurality of data lines (or image signal lines) $D_1$-$D_m$ extending in a column direction to intersecting the gate lines $G_1$-$G_n$. The gate lines $G_1$-$G_n$ transmit gate signals (or scanning signals), while the data lines $D_1$-$D_m$ transmit data signals (or image signals).

Each pixel is defined by one of the gate lines $G_1$-$G_n$ and one of the data lines $D_1$-$D_m$, and includes a switching element Q connected to the display signal lines $G_1$-$G_n$ and $D_1$-$D_m$, a liquid crystal capacitor $C_{lc}$ and a storage capacitor $C_{st}$ connected thereto. Each switching element Q has three terminals, a control terminal connected to one of the gate lines $G_1$-$G_n$, an input terminal connected to one of the data lines $D_1$-$D_m$, and an output terminal connected to the liquid crystal capacitor $C_{lc}$ and the storage capacitor $C_{st}$. The liquid crystal capacitor $C_{lc}$ is connected between the switching element Q and a common voltage (or a reference voltage) $V_{com}$, while the storage capacitor $C_{st}$ is connected between the switching element Q and a predetermined voltage such as the common voltage $V_{com}$. Alternatively, the storage capacitor $C_{st}$ is connected between the switching element Q and a gate line located just above the associated pixel (referred to as a "previous gate line" hereinafter). The former connection type of the storage capacitor $C_{st}$ is called a "separate wire type", while the latter is called a "previous gate type".

Figure 2:
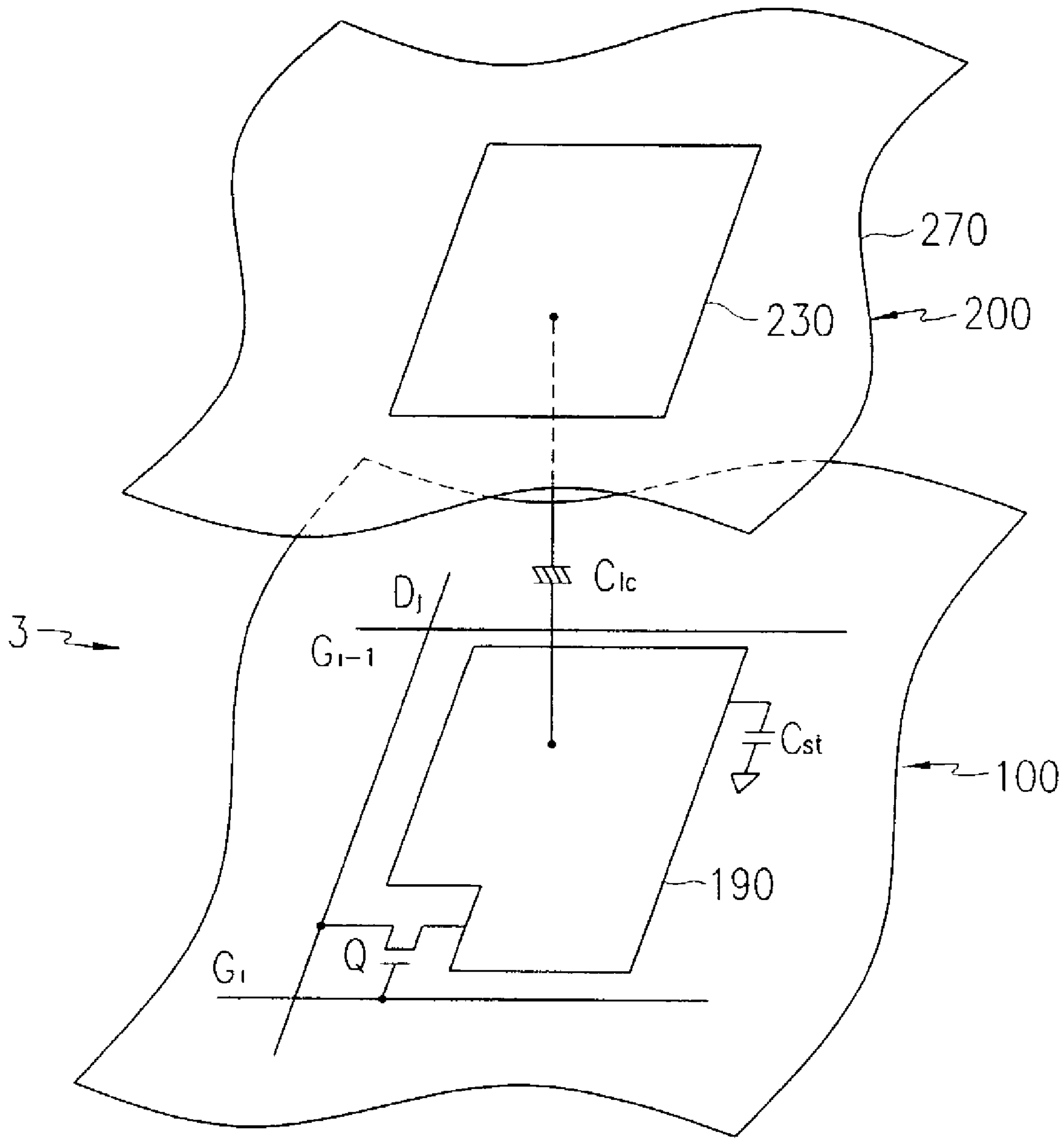
FIG. 2 is a schematic diagram of an LCD according to an embodiment of the present invention.

FIG. 2 shows a schematic structural view of an LCD according to an embodiment of the present invention. For convenience, only one pixel is depicted in FIG. 2.

As shown in FIG. 2, a liquid crystal panel assembly 300 includes a lower panel 100, an upper panel 200 and a liquid crystal layer 3 interposed therebetween. A plurality of gate lines $G_{i-1}$ and $G_i$, a data line $D_j$, a switching element Q and a storage capacitor $C_{st}$ is provided on the lower panel 100. A liquid crystal capacitor $C_{lc}$ has two terminals respectively formed of a pixel electrode 190 on the lower panel 100 and a reference electrode 270 on the upper panel 200, and a dielectric formed of the liquid crystal layer 3 between the electrodes 190 and 270.

The pixel electrode 190 is connected to the switching element Q. The reference electrode 270 covers the entire surface of the upper panel 200 and is connected to the reference voltage $V_{com}$.

The liquid crystal molecules in the liquid crystal layer 3 changes their arrangement depending on the variation of electric field generated by the electrodes 190 and 270, thereby inducing the change of the polarization of light incident into the liquid crystal layer 3. The change of the polarization turns out to be the change of the light transmittance by polarizers (not shown).

In the meantime, a wire applied with the reference voltage $V_{com}$ is preferably provided on the lower panel 100 and overlaps the pixel electrode 190 to form a storage capacitor $C_{st}$ along with the pixel electrode 190. In case of the previous gate type, the pixel electrode 190 overlaps a previous gate line $G_{i-1}$ via an insulator to form two terminals of a storage capacitor $C_{st}$ along with the previous gate line $G_{i-1}$.

FIG. 2 shows a MOS transistor as an example of a switching element, and the MOS transistor is practically realized as a TFT with a channel layer made of amorphous silicon or polysilicon.

According to another embodiment, the reference electrode 270 is provided on the lower panel 100, and, in this case, the two electrodes 190 and 270 have stripe shapes parallel to each other.

In order to obtain color display, each pixel displays a color by providing red, green or blue color filter 230 in an area corresponding to the pixel electrode 190. In FIG. 2, the color filter 230 is provided in an appropriate area on the upper panel 100. Alternatively, the color filter 230 is provided on or under the pixel electrode 190 of the lower panel 100.

Referring again to FIG. 1, the driving voltage generator 700 generates a gate-on voltage $V_{on}$ for turning on the switching elements Q, a gate-off voltage $V_{off}$ for turning off the switching elements, and the common voltage $V_{com}$.

The gray voltage generator 800 generates a plurality of gray voltages associated with grays.

The gate driver 400, also referred to as the "scan driver", is connected to the gate lines $G_1$-$G_n$, and applies gate signals to the appropriate gate lines $G_1$-$G_n$. Each gate signal is formed of a combination of the gate-on voltage and the gate-off voltage.

The data driver 500, also referred to as the "source driver", is connected to the data lines $D_1$-$D_m$, and selects the gray signals from the gray voltage generator 800 to apply as the data signals to the appropriate data lines $D_1$-$D_m$.

The signal controller 600 generates control signals for controlling the operations of the gate driver 400, the data driver 500, the driving voltage generator 700 and the gray voltage generator 800, to provide for appropriate devices.

Now, the operation of the LCD will be described in detail.

The signal controller 600 receives gray signals R, G and B and input control signals controlling the display of the gray signals R, G and B from an external source (not shown). The input control signals include a vertical synchronization signal $V_{sync}$, a horizontal synchronization signal $H_{sync}$, a main clock CLK and a data enable signal DE. After generating gate control signals GCS and data control signals DCS based on the input control signals and processing the gray signals suitable for the liquid crystal panel assembly 300, the signal controller 600 supplies the gate control signals to the gate driver 400 and the data control signals and the processed gray signals R', G' and B' to the data driver 500. The signal controller 600 also provides some control signals for the driving voltage generator 700 and the gray voltage generator.

The gate control signals GCS include a vertical synchronization start signal STV instructing to begin outputting gate-on pulses with the gate-on voltage $V_{on}$, a gate clock CPV controlling the timing of the gate on pulses, and a gate on enable signal OE determining the width of the gate on pulse. The data control signals DCS include a horizontal synchronization start signal STH instructing to begin inputting the gray signals, a load signal LOAD or TP instructing to apply the data voltages to appropriate data lines $D_1$-$D_m$, a reverse control signal RVS for reversing the polarities of the data voltages, and a data clock HCLK. Among the gate control signals GCS, the a vertical synchronization start signal STV and a gate clock CPV are provided for the gray voltage generator 800.

The gate driver 400 sequentially applies the gate on pulses to the gate lines $G_1$-$G_n$ based on the gate control signals GCS, thereby turning on the switching elements Q connected thereto. At the same time, the data driver 500 provides the gray voltages from the gray voltage generator 800, which correspond to the gray signals R', G' and B' for the pixels including the turned-on switching elements Q, to the appropriate data lines $D_1$-$D_m$ as the data voltages. The data voltages are applied to the corresponding pixels via the turned-on switching elements Q. In this way, all the pixels are applied with the data voltages by sequentially applying the gate on pulses to all the gate lines $G_1$-$G_n$ during one frame.

Figure 3:
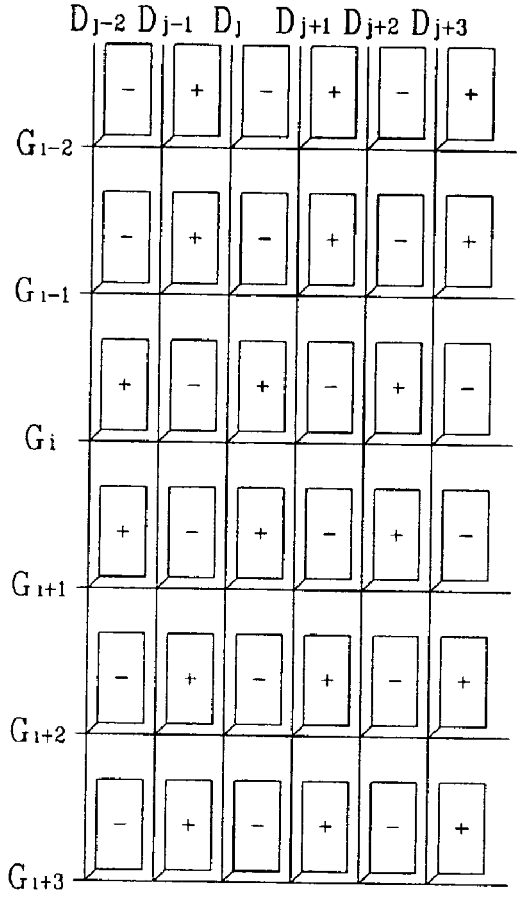
FIG. 3 shows the polarities of pixel of an LCD according to an embodiment of the present invention.

At this time, as shown in FIG. 3, the polarities of the data voltages with respect to the common voltage $V_{com}$, which are referred to as simply "the polarities of the data voltages" hereinafter, are subject to two-to-one inversion and frame inversion. That is, the polarities of the data voltages are inverted by every two rows and every column and by every frame.

In addition, between the two adjacent pixel rows with the same polarity, the absolute values of "the data voltages subtracted by the common voltage $V_{com}$" for the pixels in an upper row are larger than those in a lower row for the same grays. That is, $|d_{upper}-V_{com}|>|d_{lower}-V_{com}|$, where $d_{upper}$ and $d_{lower}$ are the data voltages indicating the same gray for the upper and the lower pixel rows, respectively. The "absolute value of a voltage" in this specification means the absolute value of the voltage subtracted by the common voltage $V_{com}$.

According to an embodiment shown in FIG. 3, the data voltages for the i-th pixel row and the (i+1)-th pixel row have the same polarity, but have the different polarity from those for the (i−2)-th and the (i−1)-th pixel rows. For example, the data voltages for the j-th pixels in both the i-th and the (i+1)-th pixel rows have the positive polarity, while those in both the (i−2)-th and the (i−1)-th pixel rows have the negative polarity.

Let us assume that $d_i$ and $d_{i+1}$ are the data voltages for the j-th pixels in the i-th and the (i+1)-th pixel rows, respectively, and $V_i$ and $V_{i+1}$ are the pixel voltages, which are defined by the voltages across the liquid crystal capacitors $C_{lc}$, of the j-th pixels in the i-th and the (i+1)-th pixel rows, respectively. Furthermore, it is assumed that $d_i$ and $d_{i+1}$ represent the same gray, and thus $|d_i-V_{com}|>|d_{i+1}-V_{com}|$.

Figure 4:
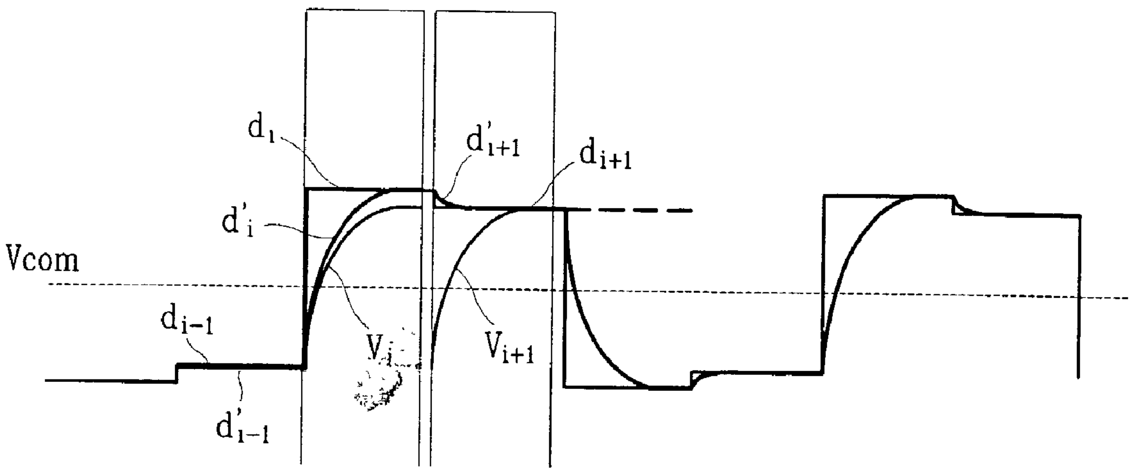
FIG. 4 illustrates waveforms of signals suitable for an LCD according to an embodiment of the present invention.

As shown in FIG. 4, the data voltages $d_i$ and $d_{i+1}$ experience RC delay to become $d'_i$ and $d'_{i+1}$ during flowing through the data line $D_j$. The data voltage $d_i$ experiences much larger RC delay since it takes time to reach the expected value from the previous data voltage $d_{i-1}$ with the negative polarity. On the contrary, the data voltage $d_{i+1}$ hardly experiences the RC delay since the difference between the data voltages $d_i$ and $d_{i+1}$ is relatively small. Since the data voltage $d_i$ has a larger absolute value than the data voltage $d_{i+1}$, the voltage drop of the pixel voltages $V_i$ in the upper row due to the RC delay is compensated. In particular, if the difference between the values of the data voltages $d_i$ and $d_{i+1}$ is determined such that the pixel voltages $V_i$ and $V_{i+1}$ reach the same value, the voltage drop is fully compensated.

In the meantime, when the voltage drop due to the parasitic capacitance between the upper and the lower pixels is larger than the voltage drop due to the RC delay, the data voltage for the upper pixel has a smaller absolute value than that for the lower pixel for the same gray. However, in general, since the voltage drop due to the parasitic capacitance is smaller than the voltage drop due to the RC delay, the data voltage for the upper pixel is determined to have a larger absolute value than that for the lower pixel.

For this purpose, gray voltage generators according to embodiments of the present invention are designed to generate a plurality of gray voltages having different values for the same grays.

Figure 5:
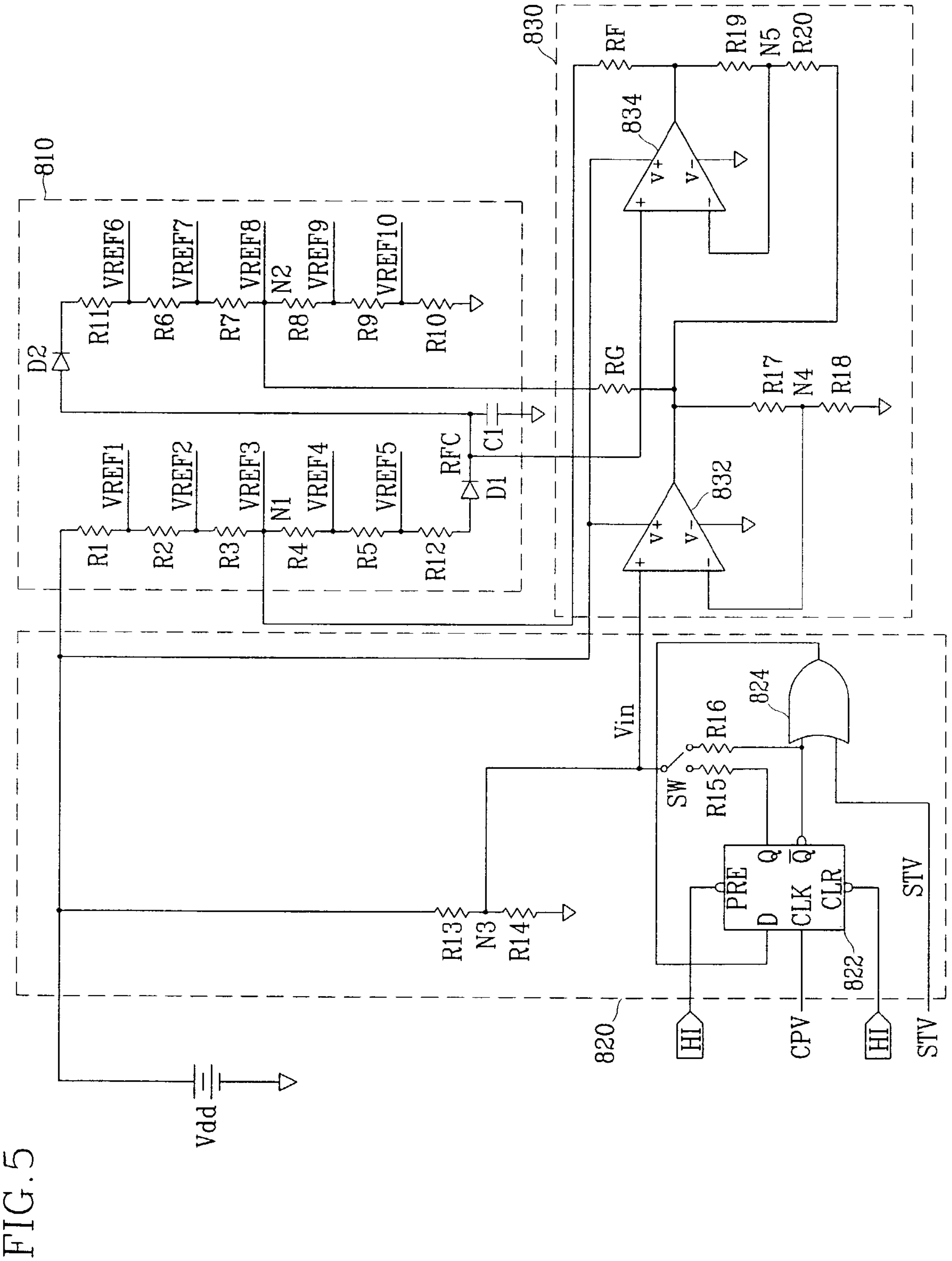
FIG. 5 is a circuit diagram of a gray voltage generator according to an embodiment of the present invention.

FIG. 5 is a circuit diagram of an exemplary gray voltage generator according to an embodiment of the present invention.

As shown in FIG. 5, a gray voltage generator according to an embodiment of the present invention includes a gray voltage producer 810, a pulse signal generator 820, and a reference voltage generator 830.

The gray voltage producer 810 includes a first array of resistors R1-R5 generating positive gray voltages VREF1-VREF5, and a second array of resistors R6-R10 generating negative gray voltages VREF6-VREF10. The first array of resistors R1-R5 and the second array of resistors R6-R10 are connected in series. The gray voltage producer 810 further includes a pair of resistors R12 and R11 connected in series between the first and the second arrays of the resistors R1-R10, a pair of diodes $D_1$ and D2 connected in series between the pair of resistors R12 and R11, and a capacitor C1 connected between a node RFC between the diodes $D_1$ and D2 and a predetermined voltage such as the ground voltage. The forward directions of the diodes $D_1$ and D2 are a direction from the first array of resistors R1-R5 to the second array of resistors R6-R10.

The resistors R1-R5 in the first array are connected in series between a predetermined voltage $V_{dd}$ from an external source and the resistor R12. The gray voltages VREF1-VREF4 are obtained from respective nodes between the resistors R1-R5, and the gray voltage VREF5 is obtained from a node between the resistors R5 and R12.

The resistors R6-R10 in the second array are connected in series between the resistor R11 and a predetermined voltage such as the ground voltage. The gray voltage VREF6 is obtained from a node between the resistors R11 and R6, and the gray voltages VREF7-VREF10 are obtained from respective nodes between the resistors R6-R10.

The pulse generator 820 includes a D flip-flop 822, an OR gate 824, a switch SW, a pair of resistors R15 and R16, and another pair of resistors R13 and R14.

The resistors R13 and R14 are connected in series between the predetermined voltage $V_{dd}$ and another predetermined voltage such as a ground voltage.

The D flip-flop 822 has a clock terminal CLK connected to a gate clock CPV from the signal processor (600 in FIG. 1), a preset terminal PRE connected to a high level HI, a clear terminal CLR connected to the high level HI, an input terminal D, an output terminal Q and an inverted output terminal $\overline{Q}$.

The OR gate 824 has a first input terminal coupled to the inverted output terminal $\overline{Q}$ of the D flip-flop 822, a second input terminal coupled to a horizontal synchronization start signal STV, and an output terminal connected to the input terminal D of the D flip-flop 822. The OR gate 824 may be substituted with dual diodes and resistors.

The resistor R15 is coupled between the output terminal Q of the D flip-flop 822 and the switch SW, while the resistor R16 is coupled between the inverted output terminal $\overline{Q}$ of the D flip-flop 822 and the switch SW. The resistances of the resistors R15 and R16 are preferably different. The switch SW in turn is connected to a node N3 between the resistors R13 and R14 to alternately connect the output terminal Q and the inverted output terminal $\overline{Q}$ to the node N3.

The reference voltage generator 830 includes a pair of amplifiers 832 and 834, two pairs of voltage gain resistors R17 and R18; R19 and R20, and another pair of resistors RF and RG.

Two supply terminals of each amplifier 832 or 834 are connected to the voltage $V_{dd}$ and a predetermined voltage such as the ground voltage, respectively. The non-inverted input terminal of the amplifier 832 is connected to the node N3 between the resistors R13 and R14, while the non-inverted input terminal of the amplifier 834 is connected to a node RFC between the diodes $D_1$ and D2. The output terminal of the amplifier 832 is connected to a node N2 between the resistors R7 and R8 via the resistor RG, while the output terminal of the amplifier 834 is connected to a node N1 between the resistors R3 and R4 via the resistor RF.

One pair of voltage gain resistors R17 and R18 are connected in series between the output terminal of the amplifier 832 and a predetermined voltage such as the ground voltage, while the other pair of voltage gain resistors R19 and R20 are connected in series between the output terminals of the amplifiers 832 and 834. Respective inverted input terminals of the amplifiers 832 and 834 are connected to a node N4 between the resistors R17 and R18 and a node N5 between the resistors R19 and R20, respectively.

Figure 6:
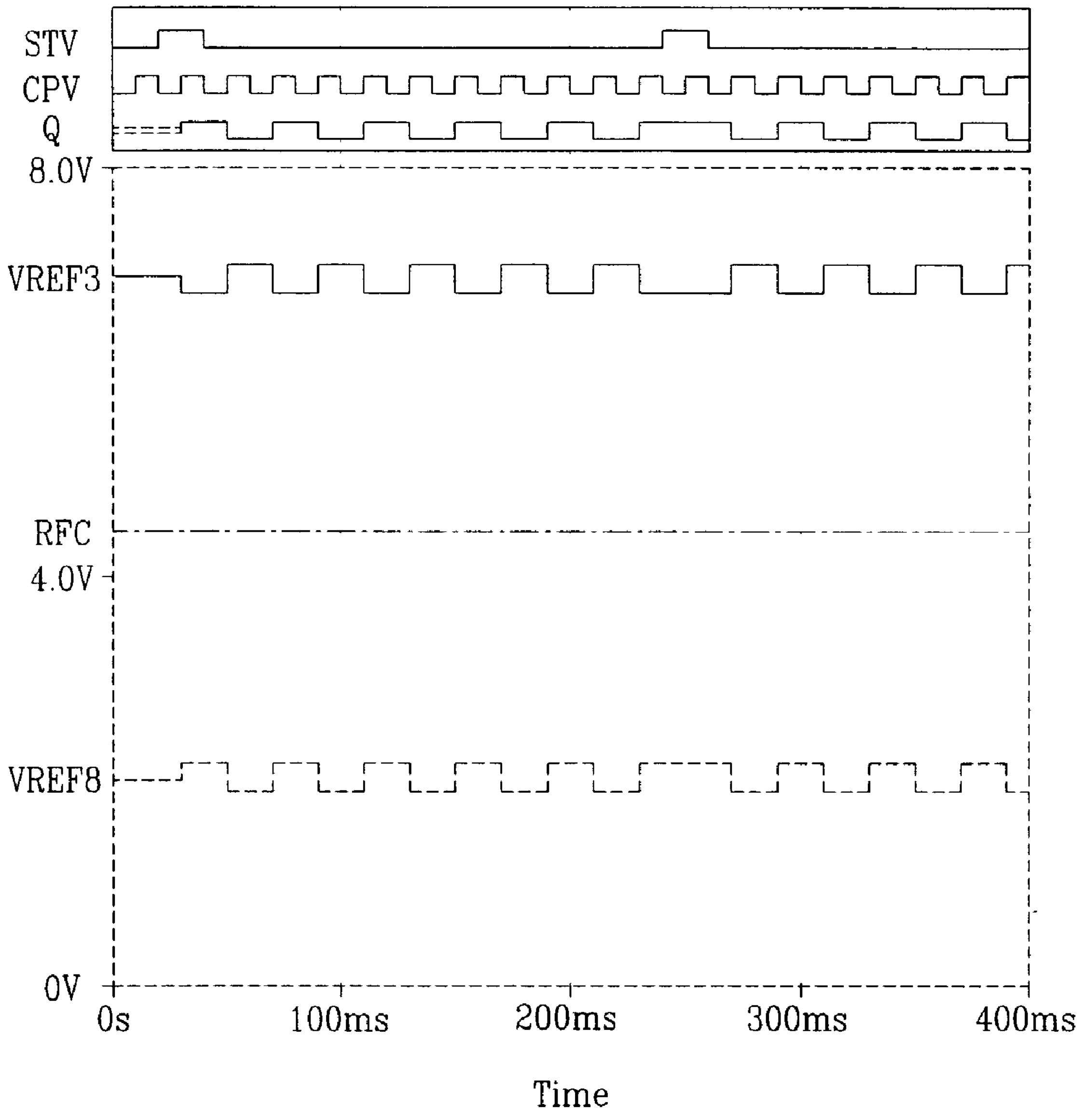
FIG. 6 shows signals required for operations of a gray voltage generator according to an embodiment of the present invention.

Now, the operation of the gray voltage generator shown in FIG. 5 is described in detail with reference to FIG. 6, which is a timing chart of signals for operation of the gray voltage generator.

Upon receipt of the horizontal synchronization start signal STV, the OR gate 824 ORs the horizontal synchronization start signal STV and the output from the inverted output terminal $\overline{Q}$ of the D flip-flop 822 to provide for the input terminal D of the D flip-flop 822.

Since the clear terminal CLR and the preset terminal PRE of the D flip-flop 822 are fixed to the high level HI, the D flip-flop 822 outputs a pair of pulse signals having a period twice the period of the gate clock CPV and inverted phases through the non-inverted output terminal Q and the inverted output terminal $\overline{Q}$ in synchronization with the gate clock CPV entering into the clock terminal CLK. The output of the inverted output terminal $\overline{Q}$ is ORed again with the horizontal synchronization start signal STV by the OR gate 824 to be returned to the input terminal D. The OR gate 824 makes the initial phase of the pulse signals to be the same for every frame.

The pair of pulse signals from the output terminal Q and the inverted output terminal $\overline{Q}$ of the D flip-flop 822 are alternately coupled to the node N3 between the resistors R13 and R14 via the resistors R15 and R16 according to switching operations of the switch SW. The switching of the switch SW is preferably performed in the same period of the gate clock CLK. Since the resistances of the resistors R15 and R16 are different, the voltage value of the node N3 is changed periodically, particularly in the same period as that of the gate clock CLK. Accordingly, the input voltage $V_{in}$ into the non-inverted terminal of the amplifier 832 periodically varies.

The amplifier 832 amplifies the input voltage $V_{in}$ of the non-inverted input terminal by a voltage gain determined by the resistances of the voltage gain resistors R17 and R18 to generate an output voltage with the same phase as the input voltage $V_{in}$, and provides the output voltage for the node N2 between the resistors R7 and R8 via the resistor RG as a reference voltage of the negative gray voltages.

The output voltage of the amplifier 832 is also provided for the inverted input terminal of the amplifier 834 via the resistor R20. The amplifier 834 inverses the input voltage of its inverted input terminal with respect to the voltage of the node RFC or the half of the voltage $V_{dd}$ to output an output voltage with reversed phase compared with the input voltage, and provides the output voltage for the node N1 between the resistors R3 and R4 via the resistor RF as a reference voltage of the positive gray voltages.

The resistances of the resistors R13, R14 and R17-R20 are determined in a manner that, when the switch SW is opened, the voltage VREF8 of the node N2 between the resistors R7 and R8 has the center value among the negative gray voltages, while the voltage VREF3 of the node N1 between the resistors R3 and R4 has the center value among the positive gray voltages.

As a result, the varying input voltage $V_{in}$ changes the values of the reference voltages VREF3 and VREF8, thereby causing the different values of the gray voltages VREF1-VREF10. The variation of the values of the reference voltages VREF3 and VREF8 can be adjusted by adjusting the resistances of the resistors RF and RG, and the resistors RF and RG are preferably variable resistors for this purpose.

Figure 7:
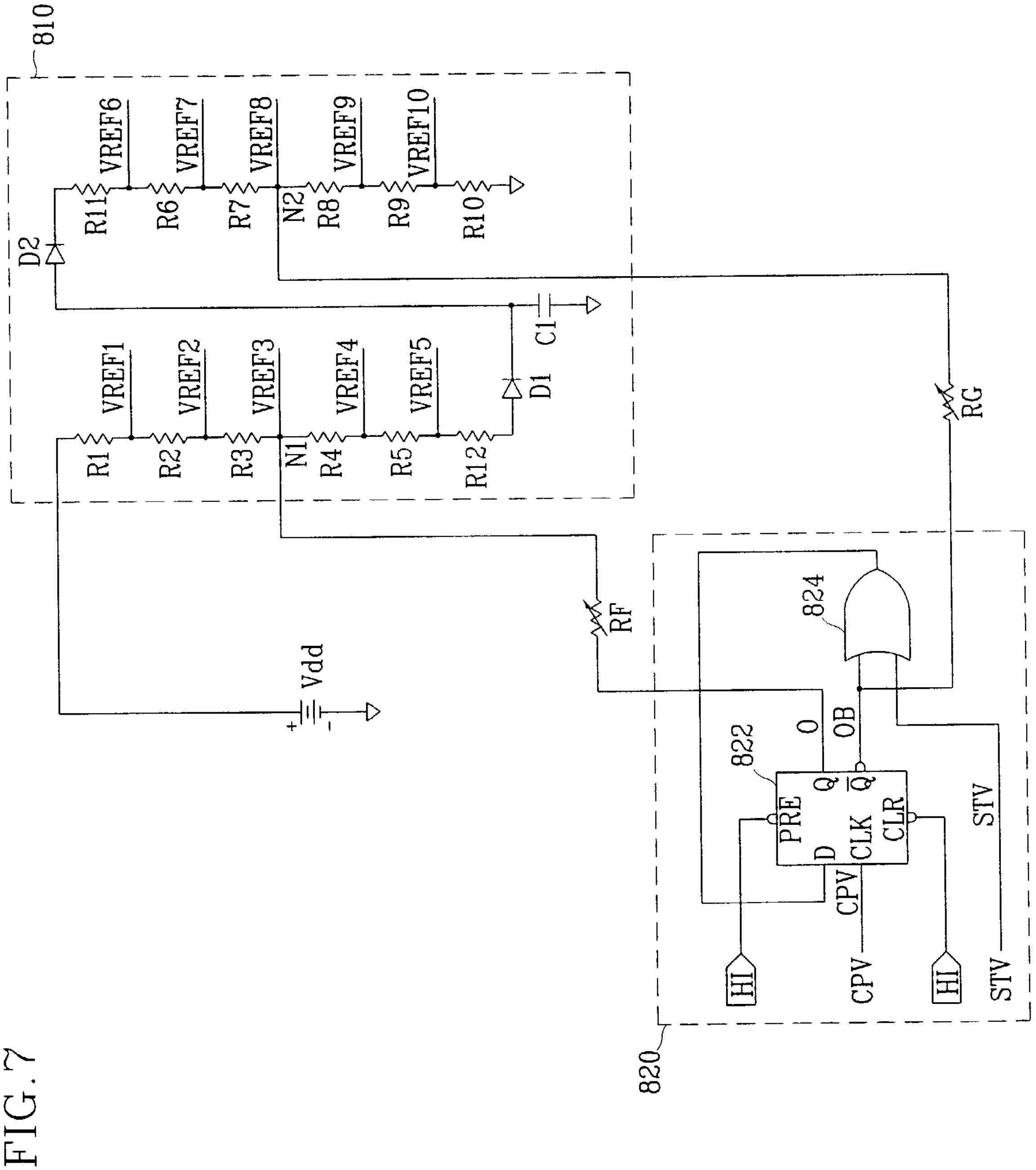
FIG. 7 is a circuit diagram of a gray voltage generator according to another embodiment of the present invention.

FIG. 7 is a circuit diagram of an exemplary gray voltage generator according to another embodiment of the present invention.

As shown in FIG. 7, a gray voltage generator according to another embodiment of the present invention includes a gray voltage producer 810, a pulse generator 820, and a pair of variable resistors RE and RG.

The gray voltage producer 810 including a series of resistors R1-R10, a pair of resistors R12 and R11, a pair of diodes D1 and D2, and a capacitor C1 has substantially the same configuration as that shown in FIG. 5.

The pulse generator 820 includes a D flip flop 822 and an OR gate 824. Four terminals PRE, CLR, CLK and I of the D flip flop 822 are configured in substantially the same way as shown in FIG. 5, while two output terminals Q and $\overline{Q}$ are directly connected to the resistors RF and RG, respectively, which in turn are connected to respective nodes N1 and N2 between the resistors R3 and R4 and between the resistors R7 and R8.

The values of reference voltages VREF3 and VREF8 are alternately changed by the output pulse signals from the output terminals of the D flip-flop 822, and the variation of the values are adjusted by adjusting the resistances of the variable resistors RF and RG.

The above embodiments described the gray voltages varying in the same period as the gate clock CLK, that is, varying every pixel row for two-to-one inversion. However, the present invention can be also applied to any types of two or more line inversions including two line inversion without column inversion, three line inversion without column inversion, three-to-one inversion, four-to-one inversion or the like. This can be obtained by changing the periods of the pulse signals from the pulse signal generator.

While the present invention has been described in detail with reference to the preferred embodiments, it is to be understood that the invention is not limited to the disclosed embodiments, but, on the contrary, is intended to cover various modifications and equivalent arrangements included within the sprit and scope of the appended claims.

What is claimed is:

1. A liquid crystal display comprising:

a plurality of gate lines transmitting gate signals;

a plurality of data lines intersecting the plurality of gate lines and transmitting data voltages;

a data driver supplying the data voltages to the data lines; and a plurality of pixel rows, each pixel row including a plurality of contiguous pixels, each of the plurality of contiguous pixels including a switching element connected to one of the plurality of gate lines and one of the plurality of data lines, wherein polarity of the data voltages supplied to the plurality of pixels are inverted by a pixel group including two or more pixel rows, and the data driver supplies the data voltages having first absolute values of the data voltages applied to one row of the pixel group with respect to a first predetermined voltage and the data voltages having second absolute values to another row of the pixel group for a same gray associated with the first predetermined voltage, the first absolute values are greater than the second absolute values.

2. The liquid crystal display of claim 1, wherein the one pixel row is firstly applied with the data voltages in the pixel group.

3. The liquid crystal display of claim 1, wherein the one pixel row is lastly applied with the data voltages in the pixel group.

4. The liquid crystal display of claim 1, further comprising:

a gate driver for sequentially supplying a gate-on voltage to the plurality of gate lines to turning on the switching elements;

a gray voltage generator generating a plurality of gray voltages, each gray voltage having at least two different values; and a data driver for selecting the plurality of gray voltages and supplying the selected gray voltages as the data voltages to the plurality of pixels via the turned on switching elements.

5. The liquid crystal display of claim 4, wherein the gray voltage generator comprising:

a gray voltage producer generating the plurality of gray voltages based on a plurality of reference voltages including a first reference voltage; and a reference voltage producer, connected to the gray voltage producer, generating the first reference voltage with a value which varies depending on the number of the pixel rows in the pixel group to provide for the gray voltage producer.

6. The liquid crystal display of claim 5, wherein the reference voltage producer comprises:

a pulse signal producer generating at least one pulse signal having a period depending on the number of the pixel rows in the pixel group; and a level adjuster adjusting a voltage level of the at least one pulse signal from the pulse signal producer to generate the first reference voltage.

7. The liquid crystal display of claim 6, wherein the at least one pulse signal comprises a first pulse signal and a second pulse signal, the first and the second pulse signals are inverted signals of each other, and the level adjuster comprises an input voltage generator alternately switching the first and the second pulse signals and changing levels of the first and the second pulse signals to generate a first voltage, and a level changer changing the first voltage to generate the first reference voltage.

8. The liquid crystal display of claim 7, wherein the input voltage generator comprises a switch alternately switching the first and the second pulse signals and a plurality of resistors comprising a pair of first resistors connected in series between a second predetermined voltage and a third predetermined voltage and a pair of second resistors respectively connected to the first and the second pulse signals, the switch is connected to a first node between the first resistors and alternately connected to the second resistors, and the input voltage generator outputs a voltage of the first node.

9. The liquid crystal display of claim 8, wherein the level changer comprises:

an amplifier amplifying the first voltage;

a third resistor connected between the amplifier and the gray voltage producer.

10. The liquid crystal display of claim 9, wherein the plurality of reference voltages further comprises a second reference voltage, and the level changer comprises:

an inverter inverting an output of the amplifier with respect to a second predetermined voltage;

a fourth resistor, connected between the inverter and the gray voltage producer, for providing the second reference voltage.

11. The liquid crystal display of claim 10, wherein the gray voltage producer comprises a plurality of fifth resistors for positive grays connected in series a plurality of sixth resistors for negative grays connected in series, one of the first and the second reference voltages are provided for a node between the fifth resistors, and the other of the first and the second reference voltages are provided for a node between the sixth resistors.

12. The liquid crystal display of claim 10, wherein the third and the fourth resistors comprise variable resistors.

13. The liquid crystal display of claim 7, wherein the pulse signal producer comprises a D flip flop generating the first and the second pulse signals based on a clock signal for the gate driver.

14. The liquid crystal display of claim 13, wherein the pulse signal producer further comprises an OR gate ORing the first pulse signal and a start signal for the gate driver to provide a signal for the D flip flop as an input.

15. The liquid crystal display of claim 6, wherein the at least one pulse signal comprises a first pulse signal and a second pulse signal, the first and the second pulse signals are inverted signals of each other, and the level adjuster comprises a resistor connected to one of the first and the second pulse signals.

16. The liquid crystal display of claim 15, wherein the resistor comprises a variable resistor.

* * * * *